(12) United States Patent
Sabe

(10) Patent No.: US 8,582,897 B2
(45) Date of Patent: Nov. 12, 2013

(54) INFORMATION PROCESSING APPARATUS AND METHOD, PROGRAM, AND RECORDING MEDIUM

(75) Inventor: Kohtaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 384 days.

(21) Appl. No.: 12/572,306

(22) Filed: Oct. 2, 2009

(65) Prior Publication Data

US 2010/0021066 A1 Jan. 28, 2010

(30) Foreign Application Priority Data

Oct. 7, 2008 (JP) ................. P2008-260331

(51) Int. Cl.
G06K 9/72 (2006.01)
G06K 9/00 (2006.01)
G06K 9/62 (2006.01)

(52) U.S. Cl.
USPC ............................ 382/229; 382/118; 382/159

(58) Field of Classification Search
None
See application file for complete search history.

(56) References Cited

U.S. PATENT DOCUMENTS

| | | | | |
|---|---|---|---|---|
| 7,272,243 | B2 * | 9/2007 | Toyama | 382/103 |
| 7,505,621 | B1 * | 3/2009 | Agrawal et al. | 382/159 |
| 7,519,201 | B2 * | 4/2009 | Yang et al. | 382/118 |
| 7,783,135 | B2 * | 8/2010 | Gokturk et al. | 382/305 |
| 2007/0036432 | A1 * | 2/2007 | Xu et al. | 382/173 |
| 2007/0076954 | A1 * | 4/2007 | Terakawa | 382/190 |
| 2008/0260261 | A1 * | 10/2008 | Li et al. | 382/209 |
| 2008/0279460 | A1 * | 11/2008 | Kasahara et al. | 382/224 |
| 2008/0317357 | A1 * | 12/2008 | Steinberg et al. | 382/209 |
| 2009/0161962 | A1 * | 6/2009 | Gallagher et al. | 382/203 |
| 2009/0257663 | A1 * | 10/2009 | Luo et al. | 382/224 |
| 2009/0279786 | A1 * | 11/2009 | Kasugai et al. | 382/195 |
| 2011/0038550 | A1 * | 2/2011 | Obrador | 382/225 |

FOREIGN PATENT DOCUMENTS

| | | |
|---|---|---|
| JP | 2005-157679 | 6/2005 |
| JP | 2005-284487 | 10/2005 |
| JP | 2007-114029 | * 5/2007 |

OTHER PUBLICATIONS

"Automatic Counting of People", Aug. 19, 2007 [online], [retrieved on Jan. 31, 2012]. Retrieved from the Internet: <URL:http://web.archive.org/web/20070819034029/http://www.pittpatt.com/solutions/people_counting.php>.*
Smith et al, "TemporalBoost for Event Recognition", 2005, Tenth IEEE International Conference on Computer Vision, pp. 1-8.*
Yang et al, "Learning Actions Using Robust String Kernels," 2007, LNCS 4814, pp. 313-327.*
Vu et al, "Audio-Video Event Recognition System for Public Transport Security," 2006, The Institution of Engineering and Technology Conference on Crime and Security, pp. 1-6.*
Cheng et al, "Semantic-Event Based Analysis and Segmentation of Wedding Ceremony Videos," 2007, MIR'07, pp. 1-10.*
Definition of "Scene", 2013, [database online], [retrieved on May 14, 2013 ] Retrieved from the Internet <URL: http://www.dictionary.com>, pp. 1.*

* cited by examiner

Primary Examiner — Bhavesh Mehta
Assistant Examiner — David F Dunphy
(74) Attorney, Agent, or Firm — Finnegan, Henderson, Farabow, Garrett & Dunner, LLP

(57) ABSTRACT

An information processing apparatus includes a face detecting unit configured to detect a face in an image; a discriminating unit configured to discriminate an attribute of the face detected by the face detecting unit; a generating unit configured to generate, from the face detected by the face detecting unit and the attribute discriminated by the discriminating unit, a feature amount of the image; and a learning unit configured to learn, from the feature amount generated by the generating unit, information for discriminating whether the image corresponds to a predetermined scene.

7 Claims, 13 Drawing Sheets

| FaceDetectionResultList | | | |
|---|---|---|---|
| | FIELD | UNIT | RANGE |
| NUMBER OF FACES | size() | NUMBER | |

52

| FaceDetectionResult | | | |
|---|---|---|---|
| | FIELD | UNIT | RANGE |
| FACE POSITION | px | PIXEL | |
| | py | | |
| FACE SIZE | sx | | |
| | sy | | |
| FACE DIRECTION | roll | [rad] | [-2pi, 2pi] |
| | pitch | | [-pi, pi] |
| | yaw | | |
| SCORE | score | | |
| DIRECTION CLASS | label | | |

FacialPartsLocalizeResultList — 71

| FIELD | UNIT | RANGE |
|---|---|---|
| size() | NUMBER OF PARTS | |

FacialPartsLocalizeResult — 72

| | FIELD | UNIT | RANGE |
|---|---|---|---|
| PART TYPE | partsid | ID UNIQUE TO PART TYPE | |
| PART POSITION | px | PIXEL | |
| | py | | |
| SCORE | score | SCORE OF DETECTOR | [0, 1] |

| MEANING | FIELD NAME | UNIT | VALUE RANGE |
|---|---|---|---|
| FACE POSITION | npx | BASED ON SCREEN SIZE | [0.0 - 1.0] |
| | npy | | |
| FACE SIZE | nsx | | |
| | nsy | | |
| FACE DIRECTION | roll | [rad] | [-2pi, 2pi] |
| | pitch | | [-pi, pi] |
| | yaw | | |
| ATTRIBUTE | Smile | MEASURE OF CONFIDENCE | [0.0 - 1.0] |
| | Gender | | |
| | Adult | | |
| | Baby | | |
| | Elder | | |
| | Mongoloid | | |
| | Caucasoid | | |
| | Negroid | | |
| | EyesClosed | | |
| | Glasses | | |
| | EyesToMe | | |
| | UniformLight | | |

GET-TOGETHER PARTY

GRANDFATHER AND GRANDCHILD

LOVERS

CHILD

GROUP PORTRAIT

TRIP

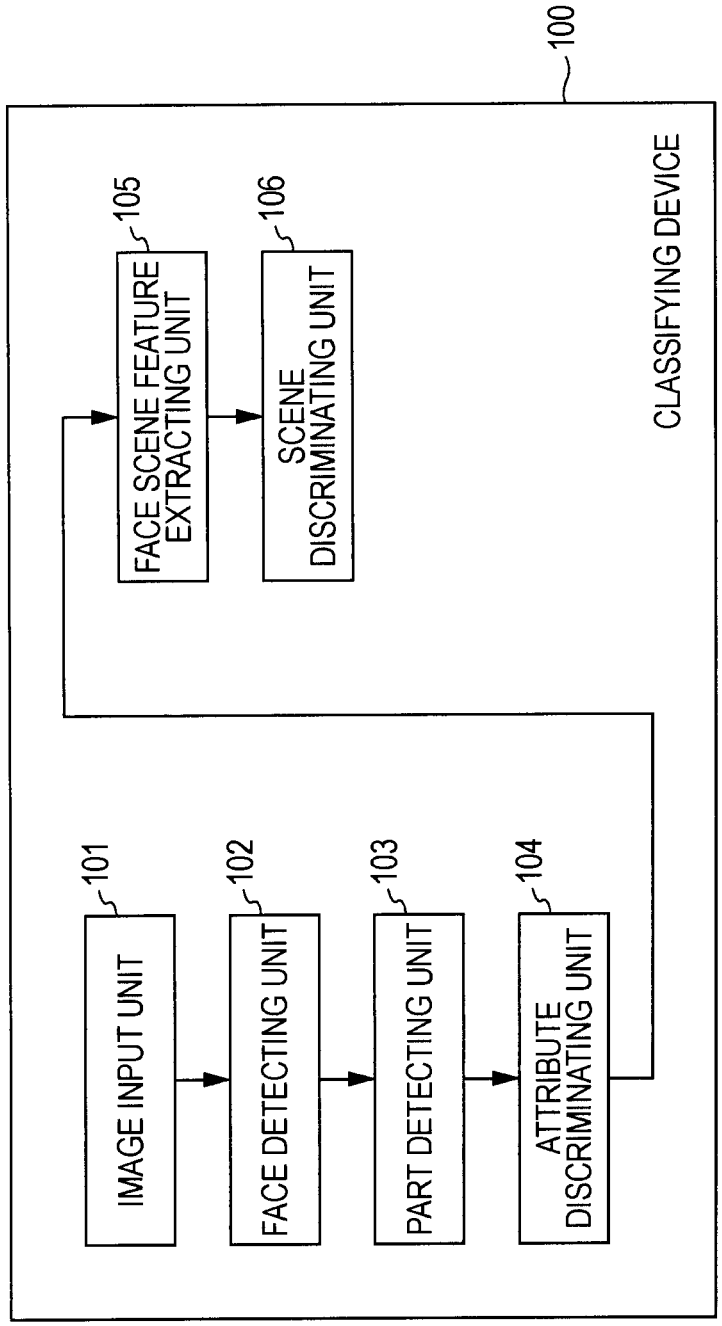

INFORMATION PROCESSING APPARATUS AND METHOD, PROGRAM, AND RECORDING MEDIUM

BACKGROUND OF THE INVENTION

1. Field of the Invention

The present invention relates to information processing apparatuses and methods, programs, and recording media, and more particularly, to an information processing apparatus and method, a program, and a recording medium that make it possible to sort images according to their scenes.

2. Description of the Related Art

Recently, digital cameras and the like have become widely used, and users have more chances to process images. For example, images captured with a digital camera or the like are increasing in number. Therefore, users desire to sort and manage the captured images under certain conditions. Most of the captured images are images including the faces of people. Taking such things into consideration, for example, it has been proposed to sort images depending on whether the images are portrait pictures, and, when the images are portrait pictures, to discriminate and sort the faces of people in the images. In order to realize the foregoing, it is necessary to discriminate the face of a person and the direction of the face (for example, see Japanese Unexamined Patent Application Publication Nos. 2005-284487 and 2005-157679).

SUMMARY OF THE INVENTION

Studies have been conducted to further discriminate the scenes of captured images. Among these studies, many of highly skillful techniques use the frequencies of appearance of local feature patterns that appear in images, such as colors or edges. The frequencies of appearance are vectorized, and the vectorized feature space is employed. In this feature space, the relationship with the label of a given scene is statistically learned to obtain an identifier, based on which discrimination is performed.

With such techniques, it may be possible to roughly discriminate scenes that are apparently different in overall appearance, such as landscapes, cityscapes, people, and dishes. However, it is difficult to discriminate scenes after understanding the meaning of the scenes, such as that a certain image corresponds to a trip scene and a group portrait scene.

Certain statistics indicate that 70% of captured images are portrait pictures. Therefore, when a user wishes to sort images for the purpose of image search, it is just not enough to simply sort the images depending on whether they are portrait pictures or not. In order to fully satisfy the purpose, it is necessary to further sort the portrait pictures on the basis of certain conditions.

The present invention provides techniques for discriminating the scenes of images, with the understanding of the meaning thereof.

According to an embodiment of the present invention, there is provided an information processing apparatus including the following elements: face detecting means for detecting a face in an image; discriminating means for discriminating an attribute of the face detected by the face detecting means; generating means for generating, from the face detected by the face detecting means and the attribute discriminated by the discriminating means, a feature amount of the image; and learning means for learning, from the feature amount generated by the generating means, information for discriminating whether the image corresponds to a predetermined scene.

The face detecting means may detect at least the position, size, and direction of the face in the image and the number of faces in the image, and the generating means may generate the feature amount by converting the position and size of the face into values that are independent of the size of the image.

The attribute may be at least one of a facial expression, sex, age, race, whether eyes are closed, whether glasses are worn, whether the eyes are directed to a camera, and whether light is uniform.

The generating means may generate the feature amount as a vector in M×N dimensions in total, the vector having N-dimensional information for each of M faces included in the image.

The learning means may perform learning by performing boosting.

A scene of an image serving as a processing target may be discriminated based on the information obtained by learning performed by the learning means.

According to another embodiment of the present invention, there is provided an information processing method including the steps of: detecting a face in an image; discriminating an attribute of the detected face; generating, from the detected face and the discriminated attribute, a feature amount of the image; and learning, from the generated feature amount, information for discriminating whether the image corresponds to a predetermined scene.

According to another embodiment of the present invention, there is provided a computer-readable program for executing processing including the steps of: detecting a face in an image; discriminating an attribute of the detected face; generating, from the detected face and the discriminated attribute, a feature amount of the image; and learning, from the generated feature amount, information for discriminating whether the image corresponds to a predetermined scene.

According to another embodiment of the present invention, there is provided a recording medium having the above program recorded thereon.

In the information processing apparatus and method and the program according to the embodiments of the present invention, a face is detected in an image; an attribute of the face is discriminated; a feature amount of the image is generated from the detected face and the discriminated attribute; and information for discriminating whether the image corresponds to a predetermined scene is learned.

According to the embodiments of the present invention, the scene of an image can be discriminated, with the understanding of the meaning thereof.

BRIEF DESCRIPTION OF THE DRAWINGS

FIG. 4 includes diagrams describing information obtained as a result of face detection;

FIG. 6 includes diagrams describing information obtained as a result of part detection;

FIG. 8 is a diagram describing a feature amount;

FIG. 11 is a diagram illustrating a structure of a classifying device according to an embodiment of the present invention;

DESCRIPTION OF THE PREFERRED EMBODIMENTS

Figure 1:
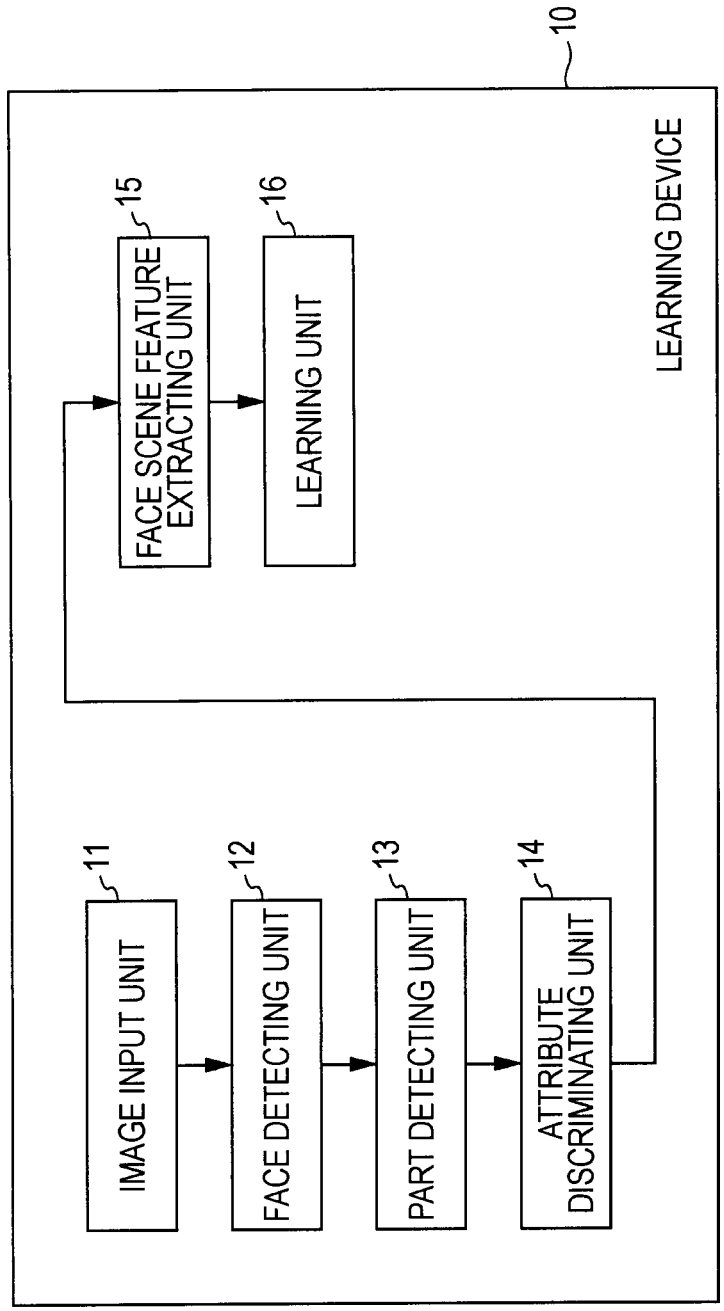
FIG. 1 is a diagram illustrating a structure of a learning device according to an embodiment of the present invention.

Hereinafter, an embodiment of the present invention will be described with reference to the drawings.

Now, the outline of an embodiment of the present invention will be described. By applying an embodiment of the present invention, for example, it is made possible to perform learning for sorting images captured with a digital camera according to their scenes and, using the learning results, to sort the images according to the scenes. An embodiment of the present invention is applicable to, for example, a digital camera. Accordingly, captured images can be sorted according to their scenes, and processing based on the sorting results can be applied to the images. Also, an embodiment of the present invention is applicable to a personal computer, for example. Accumulated images can be sorted and managed according to their scenes, and processing based on the sorting results can be applied to the images.

In this embodiment, ensemble learning is used as a learning algorithm for classifying images according to their scenes. A learning machine obtained by performing ensemble learning includes many weak hypotheses and a combiner for combining these weak hypotheses. One example combiner that combines the outputs of weak hypotheses on the basis of a fixed weight regardless of input is boosting. In boosting, using the results of learning weak hypotheses that have been previously generated, a distribution to which learning samples (examples) conform is processed so that the weights of incorrectly classified learning samples will be increased. On the basis of this distribution, learning of a new weak hypothesis is performed. Accordingly, the weight of a learning sample that is difficult to be classified as an object since the learning sample is incorrectly classified many times is relatively increased, and, as a result, a weak classifier that correctly classifies a learning sample that has a large weight, i.e., that is difficult to be classified, is serially selected. In this case, weak hypotheses are serially generated in learning, and weak hypotheses that are generated later depend on weak hypotheses that are generated previously.

To detect an object, the classification results of many weak hypotheses that are serially generated by learning as above are used. For example, in the case of Adaptive Boosting or AdaBoost, all classification results of weak hypotheses (hereinafter referred to as weak classifiers) generated by this learning (the result is 1 when an object is detected and −1 when no object is detected) are supplied to a combiner. For all the classification results, the combiner performs weighted addition of reliability calculated at the time of learning performed with each corresponding weak classifier, and outputs the result of a weighted majority vote. By evaluating the output value of the combiner, whether an input image is an object or not is selected.

A weak classifier is a device that determines whether an instance is an object or not by using a certain feature amount. In this embodiment, as will be described later, a weak classifier is a device that determines whether an image is an image that corresponds to a predetermined scene.

FIG. 1 illustrates a structure of a learning device according to an embodiment of the present invention. A learning device 10 illustrated in FIG. 1 includes an image input unit 11, a face detecting unit 12, a part detecting unit 13, an attribute discriminating unit 14, a face scene feature extracting unit 15, and a learning unit 16.

The image input unit 11 receives, as input, an image labeled as a predetermined scene (called a positive image) and an image labeled as not corresponding to a predetermined scene (called a negative image). The image input unit 11 includes an interface that receives image data as input.

The face detecting unit 12 detects the face of a person in the image received at the image input unit 11. The part detecting unit 13 detects parts constituting the face, such as the eyes, nose, and mouth, in the face detected by the face detecting unit 12. By detecting a face and further detecting the parts of the face, the position of the face and the face region in the image can be more accurately detected. On the basis of the positions of the eyes and nose, an attribute to which that person belongs can be discriminated. The attribute discriminating unit 14 determines the attribute of the person on the basis of, for example, the positional relationship among the parts detected by the part detecting unit 13. Attributes include man, woman, adult, child, elder, and the like, which will be described in detail later.

In this example, the case in which the part detecting unit 13 is provided, which detects the parts in the detected face, and, using information of the detected parts, the attribute is discriminated will be described. However, the part detecting unit 13 may not be provided. That is, instead of providing the part detecting unit 13, the attribute discriminating unit 14 may discriminate the attribute on the basis of the face detected by the face detecting unit 12.

With the processing so far, the face in the image and the direction of the face are detected, and the attribute is discriminated on the basis of such information. Using these various items of information, the face scene feature extracting unit 15 organizes various feature amounts extracted from the image as a face scene feature amount. From the face scene feature amount, the learning unit 16 learns information for sorting the image according to scene (classifier) by performing the following processing.

Referring now to the flowchart illustrated in FIG. 2, learning performed by the learning device 10 illustrated in FIG. 1 will be described.

In step S11, the image input unit 11 of the learning device 10 obtains an image. The image supplied to the image input unit 11 is labeled in advance by a user. For example, when the user wishes to perform learning for discriminating a party scene, an image determined by the user to be a party scene is labeled "party". An image labeled "party" is treated as a positive image. In contrast, an image labeled "not party scene" by the user is treated as a negative image.

Multiple labels may be given to one image. For example, when an image is labeled "party", and when that party is a birthday party of a family member, that image may also be labeled "family".

Instances that are discriminated (learned) as scenes, that is, scenes that are labeled, include, for example, party, party (stand-up party), party (get-together party), party (wedding party), party (outdoor, barbecue, or camp), athletic meet, sports, spectator sports, office, trip, children, family, couple, portrait, and group portrait. Among these scenes, images that correspond to scenes that the user wishes to be learned and images that do not correspond to these scenes are sorted by the user.

When a positive image or a negative image is received at the image input unit 11 in step S11, that image is supplied to the face detecting unit 12. In step S12, the face detecting unit 12 detects a face in the supplied image. On this occasion, the number of faces to be detected is not limited, and multiple faces may be detected. The face detecting unit 12 detects, for example, as illustrated in FIG. 3, faces in the image.

Figure 3:
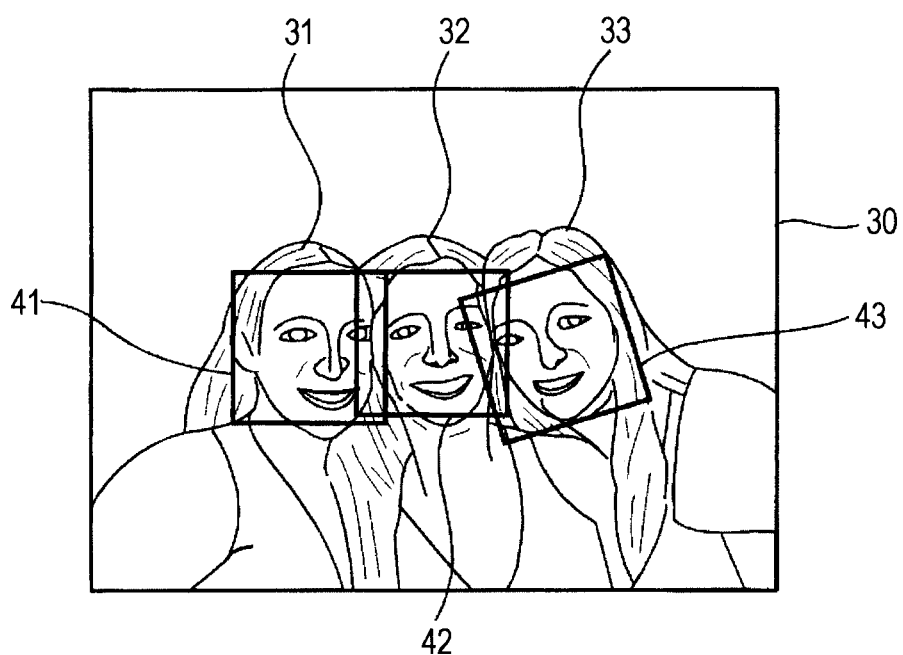
FIG. 3 is a diagram describing face detection.

An image 30 illustrated in FIG. 3 includes three people. The face of a person 31 is detected in a frame 41. The face of a person 32 is detected in a frame 42. The face of a person 33 is detected in a frame 43. For each of these detected faces, a table such as a table 52 illustrated in FIG. 4 is generated. Therefore, when the image 30 illustrated in FIG. 3 is processed, at least three tables 52 illustrated in FIG. 4 are generated. Note that, as will be described later, when it has been set that five tables are to be generated from one image, five tables are generated. When only three faces are detected, the remaining two tables 52 become tables having empty values.

A table 51 illustrated in FIG. 4 includes an item called "the number of faces". In this item, the number of faces detected in an image serving as a processing target is written. The table 52 illustrated in FIG. 4 will now be described. The table 52 illustrated in FIG. 4 includes items such as "face position", "face size", "face direction", "score", and "direction class". In the item "face position", "px" and "py" are provided as "fields". In this "px", the value of the x coordinate of the starting position of the position of the detected face, with reference to, for example, the end in the upper left-hand corner, is written. Similarly, the value of the y coordinate of the starting position of the position of the detected face is written in "py".

In the item "face size", "sx" and "sy" are provided as "fields". The value of the face size in the x-axis direction is written in "sx", and the value of the face size in the y-axis direction is written in "sy". The values in units of pixels are written in "face position" and "face size".

In the item "face direction", "roll", "pitch", and "yaw" are provided as "fields". Gradients in the vertical and horizontal directions of the detected face are expressed using "roll", "pitch", and "yaw". Values in "roll", "pitch", and "yaw" are in units of radian.

In the item "score", values regarding the likelihood of the detected face position, size, and direction are written. The item "direction class" is an item used to sort the face direction according to class.

The table 52 having the foregoing items is generated for each face detected in an image serving as a processing target. As has been described above, when the maximum number of faces to be detected is set in advance, tables 52 for that number of faces are generated.

Figure 2:
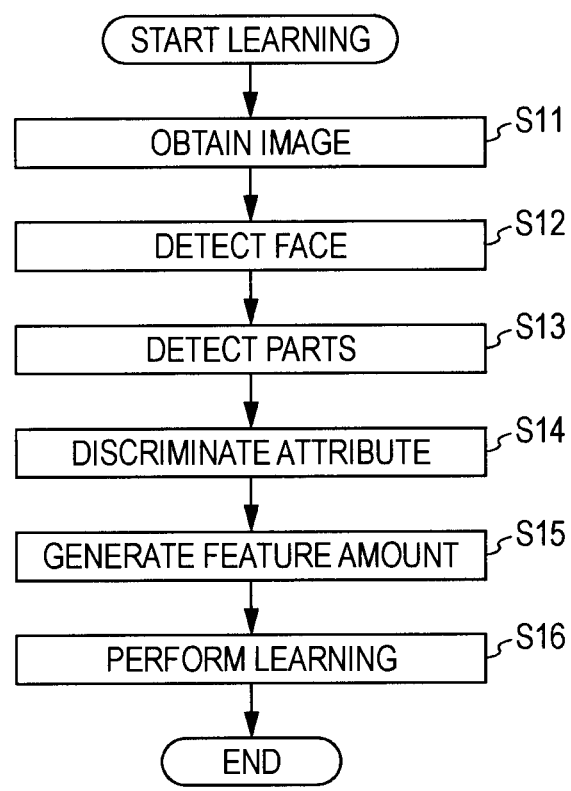
FIG. 2 is a flowchart describing learning.

Referring back to the description of the flowchart in FIG. 2, when the face detecting unit 12 detects a face in an image in step S12, the flow proceeds to step S13. In step S13, the part detecting unit 13 detects parts in the face detected by the face detecting unit 12. The face detecting unit 12 has detected a region determined to be a face in the image. The part detecting unit 13 searches for, in this region serving as a processing target, parts constituting the face, such as the eyebrows, eyes, nose, and mouth, and detects these parts. With the part detecting unit 13, for example, as illustrated in FIG. 5, the individual parts are detected in the image.

Figure 5:
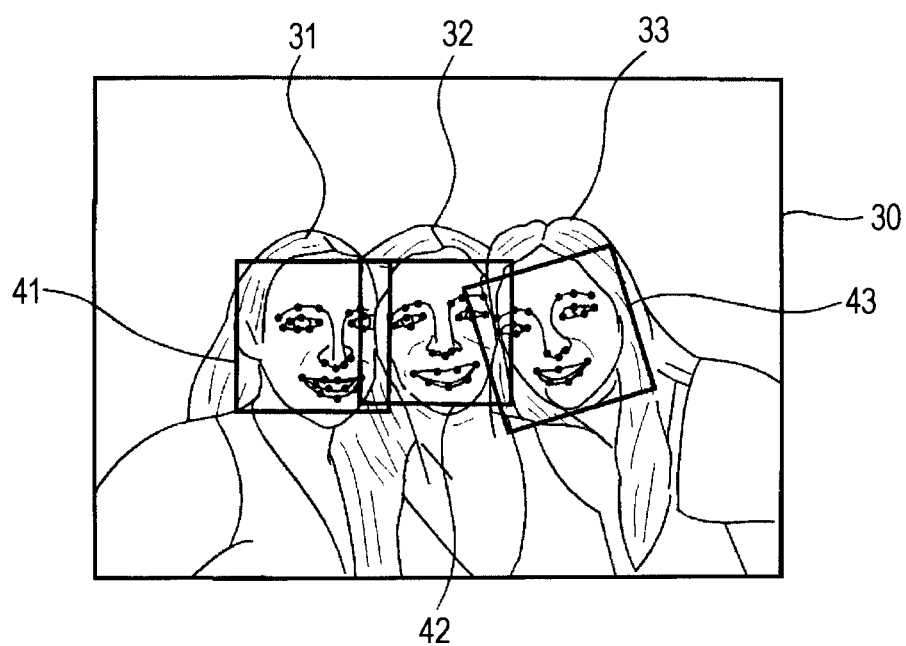
FIG. 5 is a diagram describing part detection.

The image 30 illustrated in FIG. 5 is the same as that illustrated in FIG. 3, and includes three people. The face of the person 31 is detected in the frame 41. In the frame 41, the eyebrows, eyes, nose, and mouth are detected. In the frame 41, portions indicated by points are the detected parts. Each of the parts is detected as a group of feature points. Such detection is performed for each of the detected faces, thereby generating a table such as a table 72 illustrated in FIG. 6 for each part.

A table 71 illustrated in FIG. 6 includes an item called "the number of parts". In this item, the number of parts detected in an image serving as a processing target is written. The table 72 illustrated in FIG. 6 will now be described. The table 72 illustrated in FIG. 6 includes items such as "part type", "part position", and "score". In a "field" of the item "part type", a unique ID assigned to each part type is written. In the item "part position", "px" and "py" are provided as "fields". In these "px" and "py", as is the case with the "px" and "py" of the "face position" in the table 52, values for defining the position of each part are written in units of pixels. In the item "score", the score of a detector is written.

The table 72 with the foregoing items is generated for each of parts detected in an image serving as a processing target. Therefore, for example, when it has been set that four parts including the eyebrows, eyes, nose, and mouth are to be detected in one image, four tables 72 are generated.

Referring back to the description of the flowchart in FIG. 2, when parts are detected in step S13, the flow proceeds to step S14. In step S14, the attribute discriminating unit 14 discriminates attributes.

Attributes discriminated here include, for example, smile, gender, adult, baby, elder, Mongoloid, Caucasoid, Negroid, whether the eyes are closed (EyesClosed), whether glasses are worn (glasses), whether the eyes are directed to the camera (EyesToMe), and whether the light is uniform (UniformLight). Here, the description will be given using the case in which twelve attributes are discriminated and processing is performed using these twelve attributes. However, among these twelve attributes, at least one attribute may be used. Alternatively, attributes other than these twelve attributes may be added, or attributes other than these twelve attributes may be used.

In these twelve attributes, information such as smile is information regarding facial expression; information such as adult, child, or elder is information regarding age; and information such as Mongoloid, Caucasoid, or Negroid is information regarding race. Therefore, the attribute discriminating unit 14 executes processing to discriminate at least one attribute among the attributes such as the facial expression, gender, age, race, whether the eyes are closed, whether glasses are worn, whether the eyes are directed to the camera, and whether the light is uniform.

The attribute discriminating unit 14 refers to the information regarding the parts supplied from the part detecting unit 13, and discriminates the above attributes on the basis of, for example, the positional relationship between the eyes and the positional relationship between the eyes and the nose. By discriminating the attributes, tables such as tables 91 and 92 illustrated in FIG. 7 are generated.

Figure 7:
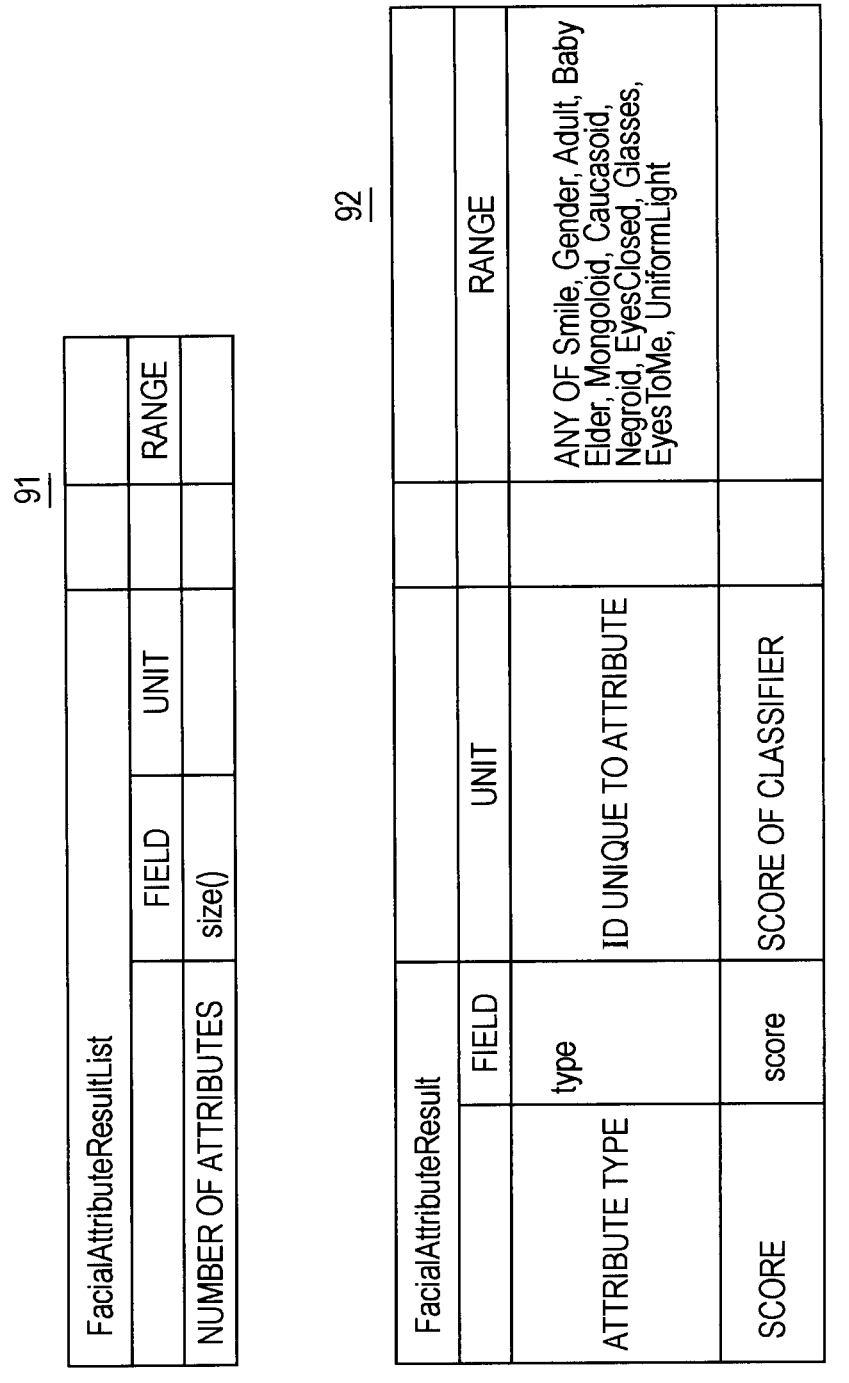
FIG. 7 includes diagrams describing attributes.

The table 91 illustrated in FIG. 7 includes an item called "the number of attributes". In this item, the number of attributes that have been or are to be detected in an image serving as a processing target is written. The table 92 illustrated in FIG. 7 includes items such as "attribute type" and "score". In the item "attribute type", an ID unique to each attribute is written. For example, an ID is assigned in advance to each of the foregoing attributes, and an ID corresponding to an attribute serving as a processing target at the time the table 92 is being generated is written. Therefore, the table 92 is generated for each attribute. When all of the above attributes are to be discriminated, since there are twelve attributes, twelve tables 92 are generated from one face. In the item "score", the score of a classifier is written.

The table 92 with the foregoing items is generated for each of attributes detected in an image serving as a processing target.

The processing so far, that is, the individual processing including detecting a face in an image, detecting parts, and discriminating attributes, is performed by using techniques disclosed in Japanese Unexamined Patent Application Publication Nos. 2005-284487 and 2005-157679, which have been previously filed by the assignee of the subject application.

Referring back to the description of the flowchart in FIG. 2, when attributes are discriminated by the attribute discriminating unit 14 in step S14, the flow proceeds to step S15. In step S15, a feature amount is generated by the face scene feature extracting unit 15. The generated feature amount is a feature amount (table) illustrated in FIG. 8.

A table 111 illustrated in FIG. 8 summarizes the face position, face size, face direction, and attributes, which have been detected by the processing performed so far by the image input unit 11, the face detecting unit 12, the part detecting unit 13, and the attribute discriminating unit 14. That is, the table 111 illustrated in FIG. 8 includes items called "face position", "face size", "face direction", and "attributes". As will be described later, information in the table 111 serves as a feature amount treated as a vector. One table 111 is generated for one face.

In the item "face position", items of information "npx" and "npy" are written. These items of information "npx" and "npy" are respectively generated from items of information "px" and "py" in the item "face position" written in the table 52 illustrated in FIG. 4. The items of information "npx" and "npy" are information representing the face position on the screen when the image width and height are 1 regardless of the resolution of the image. For example, when the image horizontal width is 640 pixels and the face position is at the position of 160 pixels, the value written in "npx" is 0.25 (=160/640).

In the item "face size", items of information "nsx" and "nsy" are written. As with the case of the above items of information "npx" and "npy", these items of information "nsx" and "nsy" are information representing the face size on the screen when the image width and height are 1 regardless of the resolution of the image.

In the item "attributes", items of information "smile", "gender", "adult", "baby", "elder", "Mongoloid", "Caucasoid", "Negroid", "eyes closed", "glasses", "eyes to me", and "uniform light" are written. In the item "attributes", a measure of confidence of each attribute is written, and its value ranges from 0.0 to 1.0. The minimum measure of confidence is 0, and the maximum measure of confidence is 1.

For example, when the measure of confidence of "smile" is 0.5, it indicates that the facial expression has been discriminated as an expression in between smiling and not smiling. The measure of confidence of "gender" is assigned in such a manner that 0.0 is assigned to a woman and 1.0 is assigned to a man. The closer the value of the measure of confidence of gender to 0.0 or 1.0, the higher the confidence of being a woman or a man.

In the foregoing manner, the table 111 is constituted by a total of nineteen dimensions including two dimensions of "npx" and "npy" of "face position", two dimensions of "nsx" and "nsy" of "face size", three dimensions of "roll", "pitch", and "yaw" of "face direction", and twelve dimensions of "smile", "gender", "adult", "baby", "elder", "Mongoloid", "Caucasoid", "Negroid", "eyes closed", "glasses", "eyes to me", and "uniform light" of "attributes". Therefore, a vector based on the table 111 is a 19-dimensional vector.

Since multiple faces are detected in one image, multiple tables 111 are generated. Specifically, when it has been set that five faces are to be detected at maximum as processing targets in one image, that is, when it has been set as default that five tables 111 are to be generated, five tables 111 are generated. In this example, five tables 111 are to be generated. The generated five tables 111 are in the descending order of the face size in one image. In such a case, a feature amount of the largest face (table 111-1), a feature amount of the second largest face (table 111-2), a feature amount of the third largest face (table 111-3), a feature amount of the fourth largest face (table 111-4), and a feature amount of the fifth largest face (table 111-5) are generated.

When five tables 111-1 to 111-5 are generated in such a manner, these tables are constituted by a vector in a total of 95 dimensions (=19 dimensions×5). Further, when the number of faces included in one image is added as one dimension constituting the vector, the vector is in 96 dimensions. In this example, the description will be given using a 96-dimensional vector. Although it has been described that the tables 111 are generated, in the actual processing, generation of such a 96-dimensional vector is executed.

In this example, it will be described that the tables 111 (feature amounts) are individually generated for the five faces, and a feature amount summarizing these feature amounts is used as the final feature amount. However, an embodiment of the present invention is not limited to five faces. That is, an embodiment of the present invention is also applicable to the case in which each of M faces included in an image has N dimensions, processing is performed by regarding a vector in a total of M×N dimensions as a feature amount, and such an M×N-dimensional vector is processed.

In this manner, a face scene feature amount is such that, for one face of face information output from a face recognition module including the face detecting unit 12, the part detecting unit 13, and the attribute discriminating unit 14, a vector computed by arranging items of information in the individual items of the table 111 illustrated in FIG. 8 serves as a single face feature amount. For the entire image, the number of faces and face scene feature amounts which are in the descending order of face size and the number of which is five at maximum serve as a face scene feature amount for the entire image. That is, a 96-dimensional vector is generated for the entire image.

The face position of the single face feature amount represents the position in the image when the image width and height are 1 regardless of the resolution of the image. The same applies to the size. Accordingly, differences in face position and size that depend on the resolution are absorbed, and images with various resolutions can be equally processed.

Regarding attributes, measures are given to the indices "smile", "gender", "adult", "baby", "elder", "Mongoloid", "Caucasoid", "Negroid", "eyes closed", "glasses", "eyes to me", and "uniform light". Accordingly, the single face feature amount becomes a 19-dimensional vector, and a face scene feature amount including five 19-dimensional vectors becomes a 96-dimensional vector. When the number of faces in an image is less than five, an undefined flag is provided for dimensions of the single face feature amount of a missing face(s).

In this manner, a feature amount represented by the 96-dimensional vector is generated by the face scene feature extracting unit 15. Referring back to the description of the flowchart in FIG. 2, when a feature amount is generated in step S15, the flow proceeds to step S16. In step S16, learning is performed.

In step S16, the learning unit 16 performs learning which is necessary for scene discrimination by using the feature amount extracted by the face scene feature extracting unit 15. In this example, learning is performed by deriving a binary classification problem of being "itself" and "not itself" for each of given category labels, such as a label indicating whether an image is a party scene or not. Therefore, one classifier is learned for one label.

Firstly, with the processing so far, a label based on each of the above scenes is given to learning samples that have been picked in advance. From the images with such labels, the above 96-dimensional face scene feature amounts are extracted, which serve as feature amounts of the individual samples. Using the feature amounts and labels, learning of classifiers is performed.

Figure 9:
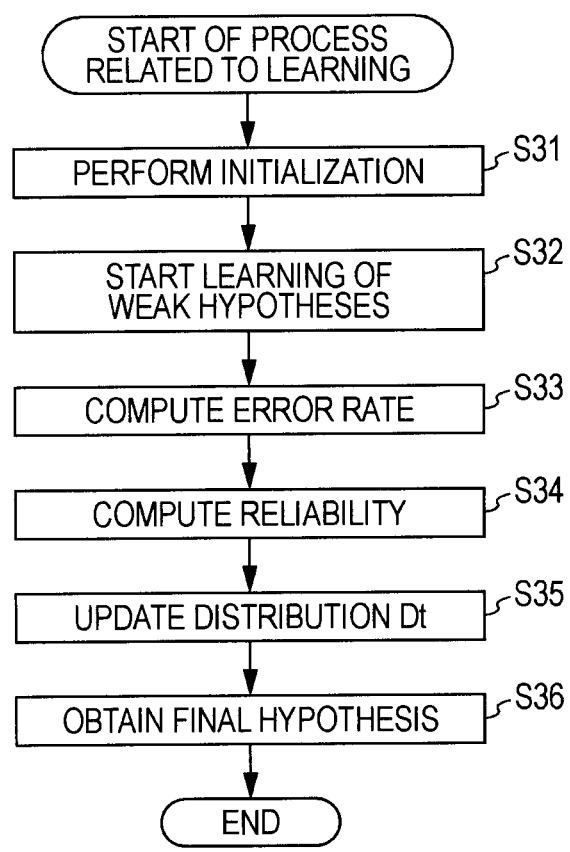
FIG. 9 is a flowchart describing a process related to learning.

For example, boosting can be used as a learning method. An exemplary process related to learning executed in step S16 will now be described with reference to the flowchart in FIG. 9. The process related to learning, which is illustrated in FIG. 9, is based on the rough steps of AdaBoost. Boosting gives a final classification result based on a majority vote by obtaining multiple weak hypotheses.

In step S31, classifiers of individual weak hypotheses are initialized. When there are N learning samples, the weight of one classifier is set as:

$$D_1(i) = 1/N \quad (1)$$

Since the weights of the individual classifiers are initialized in such a manner, the total weight of the classifiers is set to 1.

In step S32, learning of weak hypotheses based on a distribution Dt for t=1, 2, . . . T is started. A stump classifier can be used to obtain a weak hypothesis. A stump classifier is a method of taking one dimension out of the dimensions of a feature amount of each sample and determining whether that sample is positive or negative with reference to a predetermined threshold (positive-negative determination).

The weighted classification error in classification using the feature dimension and the threshold as parameters is obtained for each case, and the dimension and the threshold parameters obtained at the time the error is smallest are obtained. When a selected feature amount is an undefined value (when the number of faces in an image is insufficient), it is not able to classify that sample. Thus, it is regarded that a classification mistake has been made, and the total error is computed.

In order to realize such processing, in step S33, a weighted error rate is computed based on the following equation (2):

$$\varepsilon_t = \sum_{i: h_t(x_i) \neq y_i} D_t(i) \quad (2)$$

As indicated in equation (2), the weighted error rate $e_t$ is computed by adding only the weights of data of, among learning samples, learning samples that are incorrectly classified by a weak classifier ($f_t(xi) \neq y_i$) (learning samples that are labeled $y_1=1$ but determined as f(xi)=-1, and learning samples that are labeled $y_i=-1$ but determined as f(xi)=1). When a learning sample whose data weight $D_{t,i}$ is large (difficult to be classified) is incorrectly classified, the weighted error rate $e_t$ is increased. Then, ht:X→Y for minimizing the weighted error rate $e_t$ computed by equation (2) is obtained.

With this processing, a weak classifier that has the minimum weighted error rate $e_t$ is selected (generated) from among K weak classifiers. In step S34, the majority vote weight $\alpha_t$ is computed. This majority vote weight (reliability) $\alpha_t$ is computed based on equation (3):

$$\alpha_t = \frac{1}{2} \ln\left(\frac{1-\varepsilon_t}{\varepsilon_t}\right) \quad (3)$$

As is clear from equation (3), the smaller the weighted error rate $e_t$, the greater the reliability $\alpha_t$ of that weak classifier.

In step S35, the data weights $D_{t,i}$ of the learning samples are updated. That is, using the reliability $\alpha_t$ obtained in equation (3), the data weights $D_{t,i}$ of the learning samples are updated using equation (4). The data weights $D_{t,i}$ are necessary to be normalized so that 1 will be generally obtained when all of the data weights $D_{t,i}$ are added. Thus, the data weights $D_{t,i}$ are normalized as shown in equation (4):

$$D_{t+1}(i) = \frac{D_t(i)\exp(-\alpha_t y_i h_t(x_i))}{Z_t} \quad (4)$$

where Zt is a normalization factor (6) for obtaining the following (5):

$$\sum_{i=1}^{N} D_{t+1}(i) = 1 \quad (5)$$

$$Z_t = \sum_{i=1}^{N} D_t(i)\exp(-\alpha_t y_i h_t(x_i)) \quad (6)$$

In step S36, the weighted majority vote H(x) is updated. This processing is performed on the basis of equation (7). With equation (7), the final hypothesis is obtained by subjecting all the hypotheses to the weighted majority vote using the reliability:

$$H(x) = \text{sgn}\left(\sum_{t=1}^{T} \alpha_t h_t(x)\right) \quad (7)$$

Equation (7) gives the value H(t) of the weighted majority vote in AdaBoost when it is set that the number of weak classifiers is t (=1, . . . , K), the majority vote weight (reliability) corresponding to a weak classifier is $\alpha_t$, and the output of a weak classifier is $f_t(x)$. Also, equation (7) is an sgn function. An sgn function is in the form of "sgn(numeric value)" and is used to examine the sign of the numeric value. When the numeric value within the parentheses is positive, the function result is "1"; when the numeric value within the parentheses is negative, the function result is "-1"; and when the numeric value within the parentheses is 0, the function result is "0".

When the maximum number of weak hypotheses that has been defined to sufficiently reduce the error is reached by repeating the processing in steps S33 to S36, learning is terminated. In this manner, learning is performed by obtaining the final hypothesis.

Such processing is performed for each learning sample, such as a positive image or a negative image. Thus, the processing in the flowchart in FIG. 2 and the processing in the flowchart in FIG. 9 are repeated for the number of samples, thereby performing learning for one scene. The integrated determination value obtained after calculations on all the weak hypotheses have been completed serves as the score of this label. The highest one of the scores of all scene labels or all the scores that exceed a certain threshold serve as the output label(s) of that image.

Alternatively, besides the 96 dimensions which are feature amounts of a sample, a stump classifier may be used by adding the difference value between the feature amounts of all the paired faces, such as the difference value between the feature amounts of the first face and the second face and the difference value between the feature amounts of the first face and the third face. In this way, the relationship between two faces, such as that the two faces have similar sizes or the two faces are of different sex, may be added to perform classification.

Another applicable method besides the above learning method is learning using a multiclass identifier. In the above example, multiclass classification is performed by learning multiple binary-classification classifiers. However, AdaBoost.M2 and AdaBoost.MH, which extend boosting to a multiclass problem, have been proposed, and these techniques can be used. Also, a technique such as ECOC boosting, which extends boosting to multiple classes by, when obtaining each weak hypothesis, randomly dividing a multiclass problem into binary classes that are different every time, solving the binary-class problems, and holding the classification results in the individual classes, can be employed.

In this manner, information for specifying the scene of a captured image (classifier) is generated from the image. Since a classifier is generated for each scene, the above learning process is repeated for each scene since multiple classifiers are generated for multiple scenes. The reason an image can be sorted according to scene by using information generated from various items of information, such as faces included in the image, the directions and sizes of the faces, and attributes, as has been described above, will additionally be described below.

FIGS. 10A to 10F are illustrations of six scenes among various conceivable scenes. Rectangles in FIGS. 10A to 10F represent the positions and sizes of detected faces. Arrows in the rectangles represent the directions of the faces.

Figure 10C:
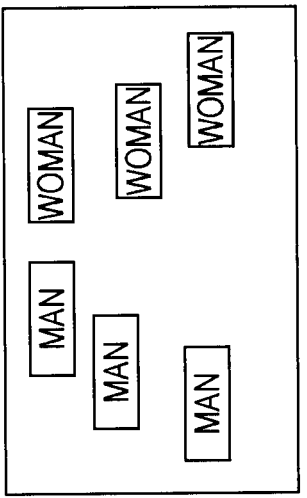
FIGS. 10A to 10F are diagrams describing scenes.
Figure 10B:
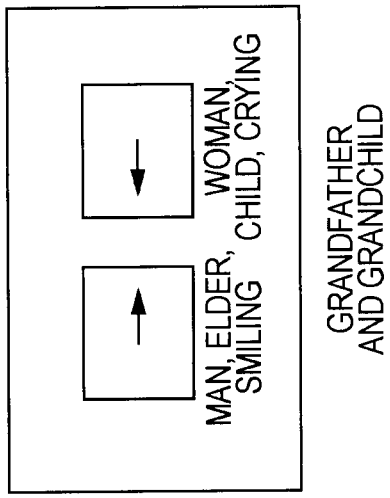
Figure 10A:
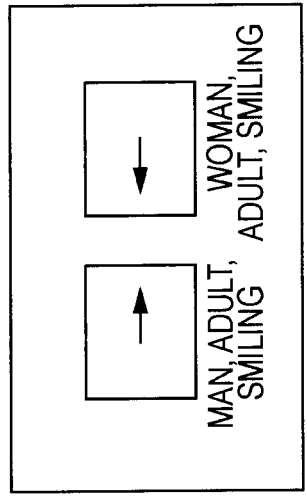

FIG. 10A illustrates the scene of lovers in a captured image. Many of captured images of lovers include an adult man and an adult woman, who are highly likely to be smiling and be facing each other. Furthermore, the faces of these people are likely to occupy large portions of the image. Taking these things into consideration, an image can be determined as a scene of lovers when the image includes a face discriminated as "man" and another face discriminated as "woman", the faces are "smiling" and occupy relatively large portions of the image, and the faces are directed to each other.

FIG. 10B illustrates the scene of a grandfather and a grandchild in a captured image. Many of captured images of a grandfather and a grandchild include an old person and a child. In many cases, the old person is a man, and the child is a girl or a boy. For example, in a captured image of a grandfather and a grandchild, the grandfather and the grandchild may be facing each other, but the grandchild may be crying whereas the grandfather may be smiling.

Taking these things into consideration, an image can be determined as a scene of a grandfather and a grandchild when the image includes a face with the attributes "man" and "elder" and another face with the attributes "woman" and "child". Furthermore, when the detected faces are facing each other and when such attributes are detected that one face is smiling whereas the other face is crying, an in-depth semantic analysis can be further performed on the scene to obtain the result that the grandfather is cradling the grandchild.

FIG. 10C illustrates the scene of a party (get-together party) in an image. Many of party (get-together party) scene images include multiple adult men and women. When multiple faces are detected in one image and when the detected faces include a face(s) whose attribute is "man" and a face(s) whose attribute is "woman", the image can be determined to be a party (get-together party) scene image.

Figure 10F:
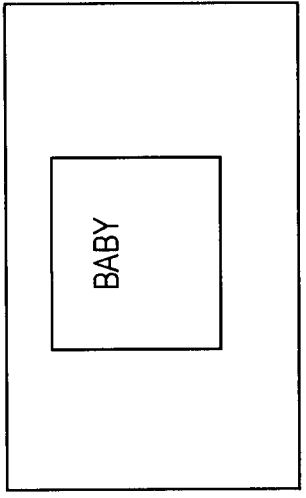
Figure 10E:
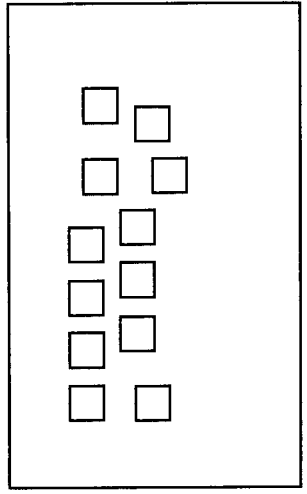
Figure 10D:
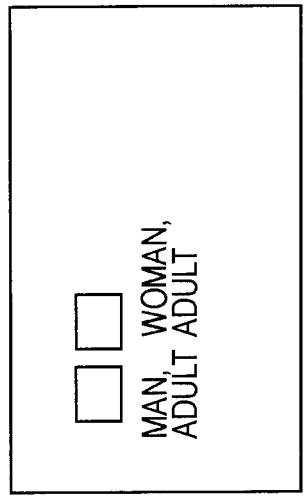

FIG. 10D illustrates the scene of a trip in an image. Many of trip scene images include a person and a landmark such as a building. In many cases, the face of the person is not a main portion of the image and, for example, occupies a small portion of the image at a corner of the image. Therefore, when a "small" face is detected in an image and when it is discriminated that the "position" of the face is in a corner of the image and that the face is directed toward "front", the image can be determined as a trip scene image.

FIG. 10E illustrates the scene of a group portrait image. Many of group portrait scene images include many small faces. When it is discriminated that the "number of" faces in an image is large, the "sizes" of the faces are small, and the "positional" relationship among the faces is such that the faces are close to one another, the image can be determined as a group portrait scene image.

FIG. 10F illustrates the scene of a baby in a captured image. Many of captured images of babies include the babies occupying large portions of the images. Therefore, when a relatively "large" face is detected in an image and when it is discriminated that the attribute of the face is "baby", the image can be determined as a captured image of a baby (child).

In such a manner, the scene of an image can be discriminated by combining items of information such as the face size and direction, the number of faces, and multiple attributes. Therefore, as has been described above, a 96-dimensional feature amount can be generated, and, from the feature amount, information for specifying the scene can be generated (a classifier can be generated) using a technique such as AdaBoost.

Next, sorting of images according to their scenes using information obtained as a result of learning will be described.

FIG. 11 illustrates a structure of a classifying device that discriminates the scene of an image. A classifying device 100 illustrated in FIG. 11 includes an image input unit 101, a face detecting unit 102, a part detecting unit 103, an attribute discriminating unit 104, a face scene feature extracting unit 105, and a scene discriminating unit 106.

Since the image input unit 101, the face detecting unit 102, the part detecting unit 103, the attribute discriminating unit 104, and the face scene feature extracting unit 105 have functions similar to the image input unit 11, the face detecting unit 12, the part detecting unit 13, the attribute discriminating unit 14, and the face scene feature extracting unit 15 of the learning device 10 illustrated in FIG. 1, detailed descriptions thereof will be omitted.

With the individual processing performed by the image input unit 101, the face detecting unit 102, the part detecting unit 103, the attribute discriminating unit 104, and the face scene feature extracting unit 105, a face scene feature amount represented by a 96-dimensional vector is extracted from an image serving as a processing target for scene discrimination. Using the feature amount, the scene discriminating unit 106 discriminates the scene of the image serving as a processing target.

Figure 12:
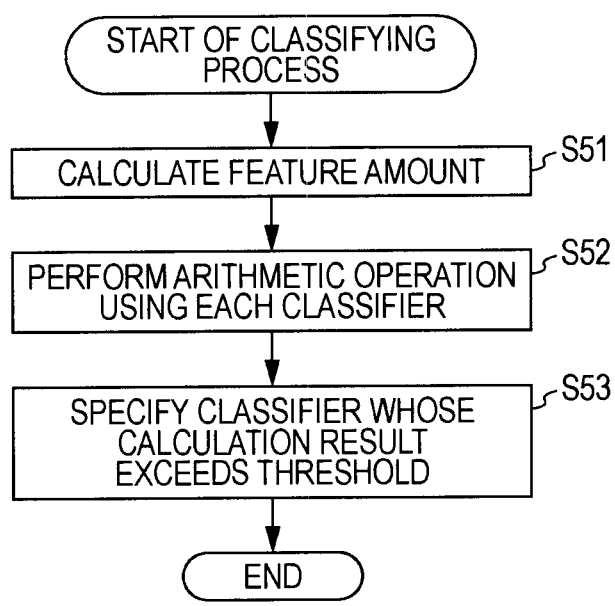
FIG. 12 is a flowchart describing a classifying process.

In the scene discriminating unit 106, results obtained by learning performed by the learning device 10, that is, multiple classifiers, are stored. Each classifier is a function obtained as a result of learning and is represented by equation (7). Referring now to the flowchart in FIG. 12, a process performed by the classifying device 100 will be described.

In step S51, a feature amount is calculated. This processing is performed by performing the individual processing using the image input unit 101, the face detecting unit 102, the part detecting unit 103, the attribute discriminating unit 104, and the face scene feature extracting unit 105. Since the processing up to this calculation has already been described, a description thereof is omitted. With this processing, a 96-dimensional face scene feature amount is calculated.

In step S52, an arithmetic operation is performed with each classifier. The scene discriminating unit 106 substitutes the feature amount extracted by the face scene feature extracting unit 105 into the individual classifiers and calculates values using the individual classifiers. Such arithmetic operations are performed in the scene discriminating unit 106, thereby obtaining the calculation results from the individual classifiers.

In step S53, the scene discriminating unit 106 specifies, among the calculation results obtained from the individual classifiers, a classifier whose calculation result has exceeded a predetermined threshold. A scene assigned to the specified classifier serves as the scene of the image serving as a processing target. If the calculation results obtained from multiple classifiers have exceeded the threshold, it means that the image serving as a processing target corresponds to multiple scenes. For example, in the case of a family photograph, the photograph may correspond to multiple scenes, such as a "family" scene, the scene of a "trip" of the family, and the scene of a "child" whose image has been captured on the trip. In such a case, a classification result indicating that the image corresponds to multiple scenes is obtained.

As above, even when one image corresponds to multiple scenes, these scenes can be accurately discriminated by applying an embodiment of the present invention.

According to an embodiment of the present invention, discrimination based on the understanding of the meaning of the entire scene can be performed by using items of face information obtained after performing face image recognition. Many of images such as photographs include faces. By applying an embodiment of the present invention, face images can be sorted into more detailed categories, and it can be regarded that an advantageous effect thereof is significant.

By combining the meanings of items of face information, the higher-level understanding of the meaning of the scene, which may not be possible by performing the processing in units of pixels, can be performed. Furthermore, using the face image information, scene discrimination can be performed without processing an image in units of pixels. Thus, scene discrimination can be performed more quickly and using less memory than scene discrimination using an existing local feature amount.

The above-described series of processes can be executed by hardware or can be executed by software. When the series of processes is to be executed by software, a program constituting the software is installed from a program recording medium into a computer embedded in dedicated hardware, or into a general personal computer, for example, which can execute various functions using various programs being installed therein.

Figure 13:
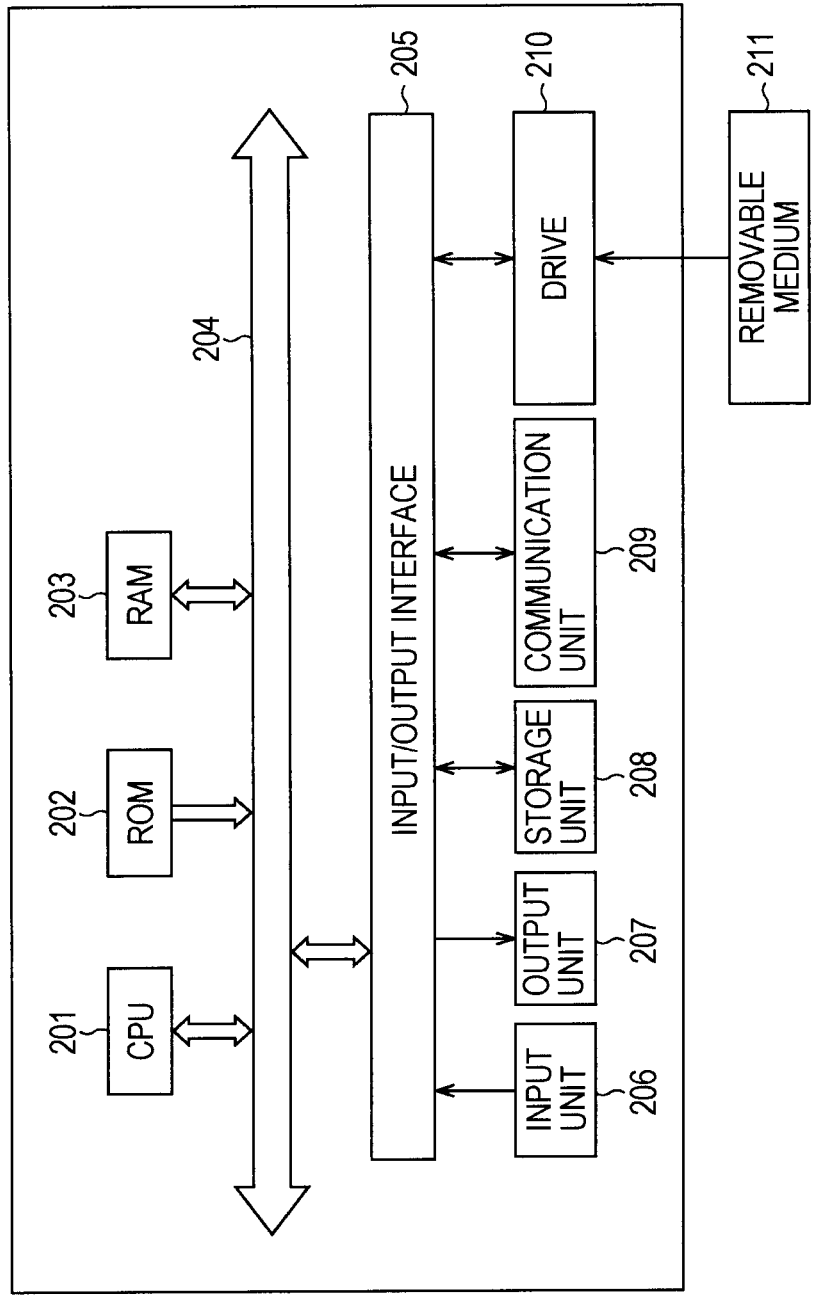
FIG. 13 is a diagram describing a recording medium.

FIG. 13 is a block diagram illustrating a structure example of hardware of a personal computer that executes the foregoing series of processes by using a program.

In the computer, a central processing unit (CPU) 201, a read-only memory (ROM) 202, and a random access memory (RAM) 203 are interconnected by a bus 204.

Furthermore, an input/output interface 205 is connected to the bus 204. An input unit 206 including a keyboard, a mouse, a microphone, or the like, an output unit 207 including a display, a loudspeaker, or the like, a storage unit 208 including a hard disk, a non-volatile memory, or the like, a communication unit 209 including a network interface or the like, and a drive 210 that drives a removable medium 211 including a magnetic disk, an optical disk, a magneto-optical disk, a semiconductor memory, or the like are connected to the input/output interface 205.

In the computer including the foregoing units, for example, the CPU 201 loads a program stored in the storage unit 208 into the RAM 203 via the input/output interface 205 and the bus 204 and executes the program, thereby executing the foregoing series of processes.

The program executed by the computer (CPU 201) is provided by, for example, recording it on the removable medium 211, such as a magnetic disk (including a flexible disk), an optical disk (including a compact disc-read only memory (CD-ROM) and a digital versatile disc (DVD)), a magneto-optical disk, a semiconductor memory, or the like, serving as a packaged medium. Alternatively, the program may be provided via a wired or wireless transmission medium, such as a local area network (LAN), the Internet, or digital satellite broadcasting.

The program can be installed into the storage unit 208 via the input/output interface 205 by mounting the removable medium 211 onto the drive 210. Alternatively, the program may be received at the communication unit 209 via a wired or wireless transmission medium and installed into the storage unit 208. Alternatively, the program may be installed in advance in the ROM 202 or the storage unit 208.

The program executed by the computer may be a program with which the processes are performed time sequentially in accordance with the order described in the specification, or may be a program with which the processes are executed in parallel or at necessary times, such as when called.

In the present specification, the term "system" represents the overall apparatus that is constituted by a plurality of apparatuses.

The embodiments of the present invention are not limited to the foregoing embodiments, and various modifications can be made without departing from the gist of the present invention.

The present application contains subject matter related to that disclosed in Japanese Priority Patent Application JP 2008-260331 filed in the Japan Patent Office on Oct. 7, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   an image input unit configured to receive at least one positive image and at least one negative image as an input, the at least one positive image and the at least one negative image being labeled by a user in advance of being input to the image input means;
   a face detecting unit configured to detect a face in an image;
   a discriminating unit configured to discriminate an attribute of the face detected by the face detecting means;
   a generating unit configured to generate, from the face detected by the face detecting unit and the attribute discriminated by the discriminating unit, a feature amount of the image; and
   a learning unit configured to learn, from the feature amount generated by the generating unit means, information for discriminating whether the image corresponds to a predetermined scene, wherein the learning comprises:
   analyzing the feature amount of the image,
   determining a score of the image based on an analysis of the feature vector,
   comparing the score of the image to predetermined classifier scores of one or more category labels, the category labels corresponding to one or more predetermined scene categories, and assigning one or more category labels to the image when the score of the image exceeds a predetermined classifier score of the one or more category labels, wherein the generating unit generates the feature amount as a vector in M times N dimensions in total, the vector having N-dimensional information for each of M faces included in the image.

2. The information processing apparatus according to claim 1, wherein the face detecting unit is configured to detect at least the position, size, and direction of the face in the image and the number of faces in the image, and the generating unit is configured to generate means the feature amount by converting the position and size of the face into values that are independent of the size of the image.

3. The information processing apparatus according to claim 1, wherein the attribute is at least one of a facial expression, sex, age, race, whether eyes are closed, whether glasses are worn, whether the eyes are directed to a camera, and whether light is uniform.

4. The information processing apparatus according to claim 1, wherein the learning unit is configured to learn by performing boosting.

5. The information processing apparatus according to claim 1, wherein a scene of an image serving as a processing target is discriminated based on the information obtained by the learning unit.

6. An information processing method comprising the steps of:

detecting a face in an image;
discriminating an attribute of the detected face;
generating, from the detected face and the discriminated attribute, a feature amount of the image; and
learning, from the generated feature amount, information for discriminating whether the image corresponds to a predetermined scene, wherein the learning comprises:
analyzing the feature amount of the image,
determining a score of the image based on an analysis of the feature vector,
comparing the score of the image to predetermined classifier scores of one or more category labels, the category labels corresponding to one or more predetermined scene categories, and
assigning one or more category labels to the image when the score of the image exceeds a predetermined classifier score of the one or more category labels, wherein generating further comprises generating the feature amount as a vector in M times N dimensions in total, the vector having N-dimensional information for each of M faces included in the image.

7. A non-transitory computer-readable storage medium storing instructions for executing processing comprising the steps of:

receiving at least one positive image and at least one negative image as an input, the at least one positive image and the at least one negative image being labeled by a user in advance of being input to the image input means;
detecting a face in an image;
discriminating an attribute of detected face;
generating, from the detected face and the discriminated attribute, a feature amount of the image; and
learning, from the generated feature amount, information for discriminating whether the image corresponds to a predetermined scene, wherein the learning comprises:
analyzing the feature amount of the image,
determining a score of the image based on an analysis of the feature vector,
comparing the score of the image to predetermined classifier scores of one or more category labels, the category labels corresponding to one or more predetermined scene categories, and
assigning one or more category labels to the image when the score of the image exceeds a predetermined classifier score of the one or more category labels, wherein generating further comprises generating the feature amount as a vector in M times N dimensions in total, the vector having N-dimensional information for each of M faces included in the image.

* * * * *